United States Patent Office 3,658,859
Patented Apr. 25, 1972

3,658,859
PREPARATION of π-ALLYLIC TRANSITION METAL COMPOUNDS
Brian Ernest Job and Alexander Joseph Peter Pioli, Runcorn, England, assignors to Imperial Chemical Industries Limited, London, England
No Drawing. Filed Oct. 24, 1969, Ser. No. 869,384
Claims priority, application Great Britain, Oct. 31, 1968, 51,734/68
Int. Cl. C07f 7/00
U.S. Cl. 260—429.3
8 Claims

ABSTRACT OF THE DISCLOSURE

A process for the preparation of halogen substituted transition metal π-allylic compounds of general formula $R_{(n-x)}M(X)_x$ by reacting a compound of general formula $R_{(n-y)}M(X)_y$ with a halogenated organic compound having one or more halogen substituents (X). R is an allylic or substituted allylic group, M is a metal of Groups IV-A to VI-A, $n$ is the valency of M, $x$ is an integer from 1 to $n-1$ and $y$ is an integer less than $x$ and has a value from 0 to $n-2$. The process allows ready control of the degree of halogenation of the product. The reaction must be carried out in the absence of moisture and oxygen, preferably in a non-reacting solvent.

---

This invention relates to a process for the preparation of transition metal organic compounds, and in particular to the preparation of such compounds containing π-allylic ligands, as hereinafter defined, and halogen atoms.

This invention is concerned with the halogen substitution of π-allylic transition metal compounds, that is to say, organometallic compounds in which one or more allylic groups of general Formula I, below, are bonded to the metal atom:

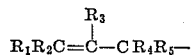  (I)

In Formula I $R_1$ to $R_5$, which may be the same or different, represent hydrogen atoms or hydrocarbyl groups such as alkyl, cycloalkyl or aryl groups, and two or more of the radicals $R_1$ to $R_5$ may be linked together to form an unsaturated ring system.

The preparation of such compounds especially those in which only the said π-allylic groups are bonded to the metal (hereinafter referred to as isoleptic compounds) has been published widely in the literature, see for example G. Wilke et al., Angewandte Chemie (Int. Edn.), vol. 5, 151, 1966.

It has also been proposed to prepare halogen substituted transition metal π-allylic compounds, in which one or more of the allyl groups are replaced by a halogen atom or atoms by the action of a halogen acid, e.g. hydrochloric acid, on an isoleptic π-allylic compound.

We have now devised a process for the halogen substitution of certain isoleptic π-allylic transition metal compounds or the further halogen substitution of partially halogen-substituted π-allylic transition metal compounds which avoids the use of such strongly acid reagents, thus simplifying experimental procedures, and also gives rise to a high degree of control over the degree of halogen substitution of the product.

According to the present invention a process for the preparation of π-allylic transition metal compounds of the general formula

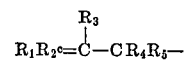

comprises reacting a compound of the general formula $(R)_{n-y}M(X)_y$ with an organic compound having at least one halogen substituent (X), where M is a transition metal, selected from Groups IV-A to VI-A of the Periodic Table of Elements,
R is an allylic group of general formula $$R_1R_2C\!=\!\overset{R_3}{\underset{\,}{C}}\!-\!CR_4R_5-$$

in which $R_1$ to $R_5$, which may be the same or different, represent hydrogen atoms or hydrocarbyl groups such as alkyl, cycloalkyl or aryl groups, and two or more of the radicals $R_1$ to $R_5$ may be linked together to form an unsaturated ring system,
$n$ is the valency of the metal M,
$x$ is an integer from 1 to $n-1$, and
$y$ is an integer which is less than $x$, and has a value from 0 to $n-2$.

In some cases, compounds produced by the process of the present invention occur in polymeric, e.g. dimeric, form and the general Formula I above is not intended to be limited to the monomeric form. The process of our invention is especially suitable for the preparation of compounds of Formula I in which the metal is selected from Group IV-A. The process is most readily applied to the preparation of halogen substituted zirconium π-allylic compounds, such as the tris(π-allyl)zirconium halides.

Transition metal organic compounds of the general Formula I above, containing any halogen ligands may be prepared by the process of our invention; but it is especially suitable for the preparation of chlorine, bromine and iodine substituted transition metal π-allylic compounds of Formula I, because of the ready availability of the halogenated organic starting materials and the ease with which many of the products may be separated from the reaction mixture.

Halogenated organic compounds which may be used include those having one or more halogen atoms in the molecule, for example, allyl chloride, methylene dichloride or chloroform. However, mono-halogen substituted organic compounds are preferred, for example compounds of formula R'X where R' is a hydrocarbyl group and X is a halogen atom, since this allows easier control of the degree of halogenation of the final product and also reduces the possibility of the formation of unwanted by-products: R' is preferably a lower alkyl, alkenyl or alkynyl group having from 1-6 carbon atoms optionally with aromatic substituents, especially phenyl.

The rate of reaction of the organic halogenated compound and transition metal compound will be dependent upon the nature of both the organic radical and the halogen substituent, that is, in the case of a mono-halogenated compound R'X, upon the nature of the hydrocarbyl group R', and of the halogen atom X. Thus, the factors affecting the reactivity of any compound within the general formula R'X may be complex and it is best determined in each case by experiment. However, certain general principles have been observed. For example, when zirconium tetra(π-allyl) was reacted with various monohalogenated organic compounds, according to our process, the chlorides, bromides and iodides showed greatest activity and for a given series of organic compounds R'X, where X was the same in each case and R' was varied, the activity of the compounds in the series was as follows:

triphenyl methyl halide>propargyl halide>t-butyl halide>allyl halide>benzyl halide≫n-propyl halide.

It will be noted that this order corresponds with that in which these compounds would be placed in order of decreasing ease of carbonium ion formation.

Although triphenyl methyl compounds generally exhibit the greatest reactivity among those listed above, it is preferred to use propargyl or t-butyl compounds since they combine rapid reaction with convenience of working.

The reaction is preferably carried out in solution in a non-reacting organic solvent such as diethyl ether, pentane or benzene, the halogenated organic compound, especially when it is of the form R'X, being dissolved in the solvent and added slowly to an agitated solution of the transition metal π-allylic compound starting material. When it is desired to isolate halogenated products of the highest purity, it is preferred to use a non-reacting hydrocarbon solvent, because it is often difficult to remove the last traces of ethers from the products. Strict precautions must be taken to exclude moisture and oxygen.

The temperature range over which the reaction may be performed is limited at its upper end by the temperature sensitivity of the π-allylic compounds used and at the lower end by maintaining the reaction at a reasonable rate. However the rate of decomposition of π-allylic transition metal compounds is a function of temperature and time, so that it is possible to tolerate higher temperatures in some cases, provided that the reaction period is short. It is desirable that the temperature of the reactants should not rise above 0° C., although temperatures up to 15° C. may be tolerated in some cases, for example when reacting the zirconium π-allyls. The precise upper temperature which may be tolerated will also depend upon the nature of the π-allylic compound being used. For example, π-2-methallyl titanium compounds which must be prepared at temperatures of about −80° C. are preferably reacted in accordance with our process at temperature of −40° C. or below. Thus it is desirable to choose a reaction temperature giving the highest speed of reaction while keeping thermal decomposition of starting materials and products to a minimum.

It is preferable that the transition metal π-allylic starting compound should be as pure as possible, since its purity may have a significant effect upon its rate of reaction.

In order to prepare a pure halogenated π-allylic product it is necessary to exercise careful control over the ratio of the transition metal starting material and halogenated organic compound. For example, when an organic compound R'X is used, each molecule of R'X added per molecule of $(R)_{n-y}M(X)_y$ will replace one π-allylic ligand R. Thus, when tetrakis(π-allyl) zirconium is used, the following reaction sequence is observed.

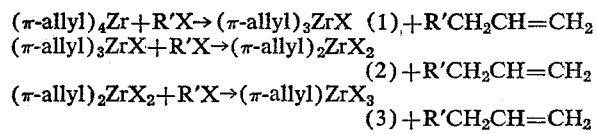

The course of the reaction may be followed by changes in I.R. and N.M.R. spectra and by measurement of the amount of propylene or other olefine evolved when a small amount of a reactant solution of known transition metal concentration is decomposed, for example with butanol.

It will be appreciated from the above that control of the degree of halogenation of the final product may be readily obtained by controlling the molecular ratios of π-allylic starting material and organic halogen compound. Thus, for example, if tetrakis(π-allyl) zirconium, is reacted with an equimolar amount of a mono-halogenated organic compound the mono-halogen substituted compound is prepared, whereas if double the amount of the same halogenated organic compound is used the dihalogen substituted compound is produced.

Compounds produced by the process of the present invention are useful catalysts in a wide variety of organic reactions, for example as olefine polymerisation catalysts.

The process will now be illustrated by the following examples.

EXAMPLE 1

1.4 ml. of propargyl bromide in 30 ml. of hexane was added slowly with stirring to 4.8 g. of tetrakis(π-allyl) zirconium in hexane at −20° C. giving a molar ratio of reactants of 1:1. When addition of halide was complete the solution was allowed to stand at room temperature for a short time, then cooled to −80° C. A brown solid precipitated and was removed from the mother liquors by filtration. Yield—3.2 g.

Analysis (percent): C, 36.5; H, 5.2; Br, 27.7. Calculated for $ZrC_9H_{15}Br$ (percent): C, 36.6; H, 5.1; Br, 27.1.

The room temperature N.M.R. spectrum of a toluene solution showed peaks at 4.63τ (quintet) and 6.73τ (broad). The analytical data indicated the presence of tris(π-allyl) zirconium bromide.

EXAMPLE 2

0.78 ml. of propargyl bromide in 5 ml. of pentane was reacted with 1.32 g. of tetrakis(π-allyl) zirconium in 20 ml. of pentane as in Example 1. The molar ratio was now 2:1. 0.8 g. of a brown solid precipitated and was removed from the mother liquors by filtration.

Analysis (percent): C, 21.3; H, 3.1; Br, 48.1. Calculated for $Zr\ C_6H_{10}Br_2$ (percent): C, 21.6; H, 3.0; Br, 47.8.

The product was therefore bis(π-allyl) zirconium dibromide.

EXAMPLE 3

1.23 g. of triphenyl methyl chloride in 8 ml. of benzene was added slowly to an equivalent (1.18 g.) of tetrakis (π-allyl) zirconium in benzene at 5° C. A colour change (red to orange) occurred immediately. The room temperature N.M.R. spectrum of the benzene solution had a quintet at 4.48τ and a broad resonance at 6.5τ, characteristic of a tris(π-allyl) halide, and also bands at 6.12τ (multiplet) and 4.92τ (multiplet), illustrating the presence of 4,4,4 triphenyl butene-1 in solution. Far infra red spectrum of the benezene solution showed absorption at 242 cm.$^{-1}$, characteristic of a bridging metal-chlorine bond. The product was therefore considered to be tris(π-allyl) zirconium chloride.

In another experiment 0.17 g. of triphenyl methyl chloride was reacted with 0.15 g. of tetrakis(π-allyl) zirconium and the reaction product (after removal of solvent) hydrolysed with $H_2O$/EtOH. Propylene was evolved corresponding to three allyl groups per zirconium atom. A white solid remained after hydrolysis and was extracted with chloroform. Removal of solvent from the chloroform extract yielded 0.145 g. of the white solid, which was shown by N.M.R. and mass spectral analysis to be 4,4,4 triphenyl butene-1.

EXAMPLE 4

1.23 g. (2 moles) of triphenyl methyl chloride in 8 ml. of benzene was reacted with 0.568 g. (1 mole) of tetrakis(π-allyl) zirconium in 5 ml. of benzene, as in Example 3, to give a yellow-orange solution. The far infra red spectrum of this solution had a band at 342 cm.$^{-1}$ characteristic of a metal chlorine bond. Hydrolysis of the reaction product as in Example 3 yielded 2 moles of propylene per zirconium atom, indicating that the product was bis(π-allyl) zirconium dichloride.

EXAMPLE 5

0.63 ml. of propargyl chloride was reacted with 2.24 g. of tetrakis(π-allyl)zirconium as in Example 1 to yield a brown solid. The solid was filtered off and dissolved in benzene. N.M.R. and I.R. spectra demonstrated that the product was tris(π-allyl) zirconium chloride.

EXAMPLE 6

0.226 ml. of t-butyl bromide in 5 ml. of benzene was slowly added to 0.53 g. of tetrakis(π-allyl) zirconium in 10 ml. of benzene at 5° C. to give a molar ratio of reactants of 1:1. After approximately 1 hour the colour had changed from red to orange. N.M.R. analysis showed the presence of tris(π-alyl) zirconium bromide in solution.

EXAMPLE 7 t-Butyl iodide and tetrakis(π-allyl) zirconium (in 1:1 molar ratio) were reacted in benzene as in Example 6. N.M.R. analysis of the reaction mixture indicated the formation of tris(π-allyl) zirconium iodide and 4,4,4 trimethyl butene-1.

EXAMPLE 8

Allyl bromide and tetrakis(π-allyl) zirconium (in 1:1 molar ratio) were mixed in benzene soltuion at 5° C. The reaction mixture was stored at −25° C. and after 24 hours the colour had changed from red to orange. Observations were consistent with the formation of tris (π-allyl) zirconium bromide.

EXAMPLE 9

Benzyl chloride and tetrakis(π-allyl) zirconium (in 1:1 molar ratio) were mixed in benzene solution at 5° C. The reaction mixture was stored at −25° C. for 14 days. At the end of this time the colour had changed from red to orange and N.M.R. analysis indicated that complete reaction to tris(π-allyl) zirconium chloride had occurred.

EXAMPLE 10

Equimolar quantities of tris(π-allyl) chromium and triphenyl methyl chloride were mixed together in benzene at −5° C. A change of colour from red to orange-brown was noted. Observations were consistent with the formation of bis(π-allyl) chromium chloride.

EXAMPLE 11

Tetrakis(π-allyl) hafnium was mixed with an equimolar amount of propargyl bromide in benzene under the conditions of Example 1. Analytical data of the product is consistent with the formation of tris(π-allyl) hafnium bromide.

EXAMPLE 12

A toluene solution of tetrakis(π-methallyl) titanium was contacted with one equivalent of triphenyl methyl chloride in toluene at about −40° C. Hydrolysis of the product yielded three moles of butene per mole of titanium compound, indicating the formation of tris(π-2-methallyl) titanium chloride.

EXAMPLE 13

2.48 g. of tris(π-allyl) zirconium bromide was dissolved in toluene (75 ml.) and cooled to −30° C. Propargyl bromide (0.73 ml.) an equimolar quantity, dissolved in toluene was added slowly with stirring. The solution was allowed to warm up to 0° C. for 10 minutes. The N.M.R. spectrum of the solution indicated the complete absence of the π-allylic zirconium starting compound. Decomposition of a sample of the product with butanol yielded two moles of propylene per mole of zirconium. The product was therefore considered to be bis(π-allyl) zirconium dibromide.

EXAMPLE 14

Triphenyl methyl chloride (1.18 g.) dissolved in benzene (5 ml.) was added to a solution of tetrakis(π-methallyl) zirconium (1.33 g.) in 5 ml. benzene. While there was no clear colour change, the N.M.R. spectrum indicated the formation of 4,4,4-triphenyl-2-methyl-butene-1 and a new organo-metallic species, considered to be tris(π-methallyl) zirconium chloride.

What we claim is:

1. A process for the preparation of π-allylic transition metal compounds of the general formula $$R_{m-x}MX_x$$

in which a solution of a transition metal compound of general formula $$R_{n-y}MX_y$$

is reacted with a stoichiometric quantity of a halogenated organic compound of general formula $$R'X$$

according to the reaction equation $$R_{n-y}MX_y + _{x-y}R'X \rightarrow$$
$$R_{n-x}MX_x + _{x-y}R'R$$

wherein

M is a transition metal of Groups IV–A to VI–A of the Periodic Table of the Elements,
R is an allylic group of general formula $$R^1R^2C=C-CR^4R^5-$$
$$\phantom{R^1R^2C=}\overset{R^3}{|}$$

in which
$R^1$ to $R^5$, which may be the same or different, are selected from the group consisting of hydrogen and hydrocarbyl groups and two or more of the radicals $R^1$ to $R^5$ may together be part of an unsaturated ring system,
R' is selected from the group consisting of alkyl, alkenyl and alkynyl groups having from 1 to 6 carbon atoms and such groups bearing aromatic substituents,
X is a halogen
$n$ is the valency of the transition metal M,
$x$ is an integer from 1 through $n-1$, and
$y$ is an integer which is less than $x$ and has a value from 0 through $n-2$.

2. The process of claim 1 in which the allylic group R is selected from the group consisting of π-allyl and π-methallyl.

3. The process of claim 1 in which the halogenated organic compound R'X is selected from the group consisting of triphenylmethyl halide, propargyl halide, t-butyl halide, allyl halide and benzyl halide.

4. The process of claim 1 in which the halogen X is selected from the group consisting of chlorine, bromine and iodine.

5. The process of claim 1 in which the transistion metal M is a metal of Group IV–A of the Periodic Table.

6. The process of claim 5 in which the transition metal M is zirconium.

7. The process of claim 6 in which tetrakis(π-allyl) zirconium is reacted with propargyl or t-butyl chloride, bromide or iodide.

8. The process of claim 1 in which the transition metal compound and the halogenated organic compound are in solution in a non-reacting hydrocarbon solvent.

References Cited

UNITED STATES PATENTS

| | | | |
|---|---|---|---|
| 3,379,706 | 4/1968 | Wilke | 260—429.5 X |
| 3,422,128 | 1/1969 | Wilke | 260—429 L |
| 3,424,777 | 1/1969 | Wilke | 260—429 L |
| 3,432,530 | 3/1969 | Wilke | 260—429.3 X |
| 3,536,740 | 10/1970 | Wilke | 260—429 L |

TOBIAS E. LEVOW, Primary Examiner

H. M. S. SNEED, Assistant Examiner

U.S. Cl. X.R.

260—429 L, 429.5, 438.5 R